(12) United States Patent
Choi

(10) Patent No.: US 8,570,651 B1
(45) Date of Patent: Oct. 29, 2013

(54) BOTH SIDE SCREEN FOR COMBINED USE OF 2D/3D IMAGES

(76) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 13/487,673

(22) Filed: Jun. 4, 2012

(51) Int. Cl.
*G03B 21/56* (2006.01)
*G03B 21/60* (2006.01)

(52) U.S. Cl.
USPC ............ 359/449; 359/443; 359/452; 359/461

(58) Field of Classification Search
CPC ....................................................... G03B 21/56
USPC ................................................ 359/443–461
See application file for complete search history.

(56) References Cited

U.S. PATENT DOCUMENTS

| | | | | |
|---|---|---|---|---|
| 5,123,192 A * | 6/1992 | Hsieh | | 40/442 |
| 6,424,463 B1 * | 7/2002 | Nishitani | | 359/449 |
| 6,992,822 B2 * | 1/2006 | Ma et al. | | 359/485.01 |
| 7,110,175 B2 * | 9/2006 | Lippey et al. | | 359/443 |
| 7,198,372 B2 * | 4/2007 | Aeling et al. | | 353/30 |
| 7,324,277 B2 * | 1/2008 | Choi | | 359/452 |
| 7,443,582 B2 * | 10/2008 | Yamauchi | | 359/449 |
| 7,495,829 B2 * | 2/2009 | Peterson et al. | | 359/459 |
| 7,623,288 B2 * | 11/2009 | Choi | | 359/359 |
| 7,974,004 B2 * | 7/2011 | Maruyama | | 359/443 |
| 2006/0098279 A1 * | 5/2006 | Yamauchi | | 359/449 |
| 2006/0152802 A1 * | 7/2006 | Tsai et al. | | 359/452 |
| 2007/0153376 A1 * | 7/2007 | Choi | | 359/459 |
| 2007/0275208 A1 * | 11/2007 | Browning | | 428/98 |
| 2008/0117506 A1 * | 5/2008 | Choi | | 359/449 |
| 2009/0190210 A1 * | 7/2009 | Coleman et al. | | 359/452 |
| 2009/0225416 A1 * | 9/2009 | Teather et al. | | 359/449 |
| 2011/0149389 A1 * | 6/2011 | Sharp et al. | | 359/452 |
| 2011/0157330 A1 * | 6/2011 | Bennett et al. | | 348/54 |
| 2011/0216405 A1 * | 9/2011 | Choi | | 359/460 |

* cited by examiner

*Primary Examiner* — Clayton E LaBalle
*Assistant Examiner* — Kevin Butler
(74) *Attorney, Agent, or Firm* — Bacon & Thomas, PLLC

(57) ABSTRACT

A screen having a front and rear surface arranged to be used with viewing both 2D and 3D images. The front and rear screen surfaces are formed differently from different materials, where the front surface is used as a 3D image screen and the rear surface is used as a screen having high resolution.

7 Claims, 4 Drawing Sheets

BOTH SIDE SCREEN FOR COMBINED USE OF 2D/3D IMAGES

FIELD OF THE INVENTION

The present invention relates to a multi-sided screen that is usable with both 2D and 3D images, i.e., has a combined use, where one surface is configured to provide high reflection rate for 3D imaging and the other surface is provided as a screen having a high resolution degree and a wide view angle for 2D imaging.

BACKGROUND

Generally, a 3D image can be viewed by a passive way and an active way.

In the passive way for viewing a 3D image, the 3D image is projected in an overlapping manner on a screen by passing a left and right image through a polarization plate provided on a front and rear face of left and right projection lens, respectively. A viewer views the 3D image by using a polarization eye-glass that separates the left and right images for 3D viewing.

Here, the 3D image can be viewed where the 3D image is reflected originally on a screen in a state that a polarization degree of the left and right image of the 3D image is not damaged.

Meanwhile, in the active way for viewing a 3D image, the 3D image is divided into a left and right image and the left and right image are projected sequentially at predetermined time intervals on a screen. A viewer views the 3D image using a 3D eye-glass that has a left and right shutter which are opened and closed sequentially in a synchronizing manner with the left and right image, which is well known in the art.

However, since a light transmission rate of the 3D eye-glass is about 10%, the projected 3D image is typically to dark to see and thus it is impossible to view the 3D image unless a bright screen is used.

Accordingly, in the passive viewing of a 3D image, a screen for the 3D image has to have a reflection function to reflect the degree of the polarization and further the reflection rate of the polarization degree has to be good to view a 3D image.

Additionally, generally, for viewing a 2D image, a screen having a high reflection rate is required, since a brightness of a small projector such as a pico projector is too low.

However, it is well known that when the screen has a high reflection rate, the left and right viewing angles narrow which decreases the contrast resulting in a lower resolution. Therefore, the prior art screens are not able to be used for viewing a 2D image and a 3D image, but require separate screens in order to meet the above described demands depending on the image to be viewed on the screen.

As known in the prior art, Korea Utility Model registration No. 20-039904, which is entitled "both side non-reflection screen", discloses a screen having both sides configured as a screen face. Even though both sides of the screen are configured as a screen face, the screen cannot have a multi-screen function and further is not configured to have a 3D image functionality.

Further, Korean Utility Model application No. 20-2004-0006510, which is entitled "multi-roll screen device", discloses a single screen having two screen faces. Even though the single screen has two screen faces, one screen face is selected depending on demands, which doubles the volume, weight and cost and is not very practical. Additionally, this screen does not have 3D image functionality.

That is, the prior art fails to disclose a multi-sided screen that has both a 3D image functionality and a 2D image functionality.

SUMMARY

An object of the present invention is to provide a multi-sided screen having two sides for the combined use of viewing 2D and 3D images, where one side is capable of functioning as a 3D image screen having a high reflection screen, and the other side having a high resolution and wide viewing range for viewing 2D images.

The multi-sided screen is configured such that the front and rear faces are formed from different materials. The multi-sided screen also has a surface particle degree of distribution on the surface being 100-3000 mesh and has aluminum deposited or applied thereon. Additionally, a dye having a refraction rate to keep the degree of polarization is applied on the surface of the screen material. Further, the screen material rear face is formed with material of white color, having a proper surface particle degree for displaying a wide view angle and high resolution.

BRIEF DESCRIPTION OF THE DRAWINGS

The above and other aspects, features and advantages of certain exemplary embodiments of the present invention will be more apparent from the following description taken in conjunction with the accompanying drawings, in which.

Figure 1:
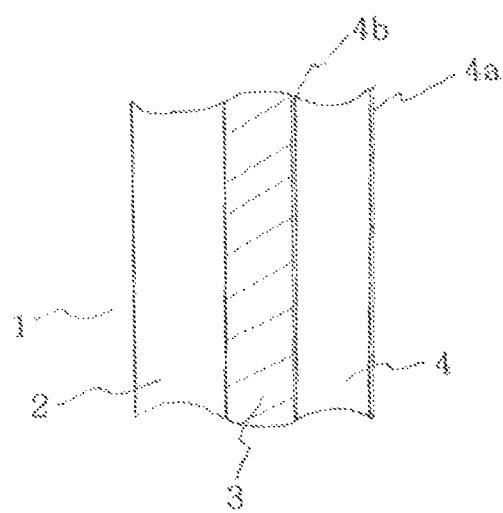
FIG. 1 is a cross-sectional view showing a part of a multi-sided screen according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF EXEMPLARY EMBODIMENTS OF THE DISCLOSURE

Exemplary embodiments of the present invention will be described below in detail with reference to the accompanying drawings. Wherever possible, the same reference numerals will be used to refer to the same elements throughout the specification, and a duplicated description thereof will be omitted.

According to an embodiment of the present invention, both faces of a screen are formed differently so that a front and a rear surface of the screen have different technical effects.

For example, the multi-sided screen having a high reflection screen is required for a bright place, whereas a high contrast or high resolution screen having a low brightness is required for a dark place.

Additionally, when a 3D image screen has low brightness or a 3D image if projected from a small projector, the screen is required to have a high degree of –polarization or have a high reflection of image brightness so that left and right viewing angles are narrow, whereas for a high contrast images, the projection is required to have a high brightness or a high resolution.

According to an embodiment of the present invention, one surface of a multi-sided screen is configured for viewing a 3D image and the other surface is configured for viewing a 2D image wherein one surface, i.e., a front surface, is configured to have a high reflection and narrow viewing angle and the other surface, i.e., a rear surface is configured to have low brightness and a wide viewing angle. The front and rear surfaces are formed differently as separate screen, so that the surfaces can be selected depending on place or purpose of the screen.

As shown in FIG. 1, a screen material 4 of the multi-sided screen 1 may be film or plastic material such as polyester or vinyl chloride.

The screen material 4 may have a different surface particle degree of distribution on the front and rear surfaces, wherein the screen material 4 can have a screen material face 4b with a 100-3000 mesh surface particle degree of distribution and a reflection layer 3 may be formed by depositing or applying aluminum thereto. Here, the reflection layer 3 has a brightness of 2 gain or more.

On the other hand, a 3D image screen face is configured on the opposite surface of the multi-sided screen by applying resin consisting of acryl, silicon and urethane having a refraction rate of 1.6 or less, on a surface of the reflection layer 3.

Further, a surface particle degree of distribution of a screen material rear surface 4a may be 80-1500 mesh, so that when a polarized 3D image is projected on a 3D image screen having a low refraction rate, e.g., 1.6, the degree of polarization is projected without loss in the polarization angle and then reflected from the reflection layer 3 so that the 3D image is re-displayed without sensitivity loss of the polarization degree.

It is well known that during the passive viewing of a polarized image having a degree of polarization as described above, a right image is blocked and a left image is projected to a left eye using the polarization eye-glass. Similarly, a right image is projected and a left image is blocked to a right eye since polarization angles of the polarization filter of respective projectors and the polarization eye-glass are configured symmetrically. When the polarization axes of the polarization filter and the polarization eye-glass are identical, the image is transmitted, and when the polarization axes of the polarization filter is different from that of the polarization eye-glass, the image is blocked.

Here, the polarization operation angle is ranged from 1-2 degree among total 180 degree, which is considered to be minute.

Accordingly, when a refraction rate increases to 1.6 or more, the refraction rate departs from the polarization operation angle and thus the polarization operation diminishes.

Additionally, it is well known that when the brightness of the 3D image is decreased to 50% or more when using shutter 3D eye glasses and the left and right images are projected from a single projector, the brightness of the 3D image in a 3D eye-glass is further decreased.

For this reason, the 3D image screen is required to have brightness of two times (2 gain) or more.

Accordingly, the reason for the surface particle degree of the screen material surface 4b being 100-3000 mesh is that a surface reflection rate of the reflection layer 3 is selected depending on the surface particle degree of distribution.

For example, when the surface particle degree of distribution is 100 mesh or less, the reflectability of the reflection surface is almost diminished, and when the surface particle degree is 3000 mesh, the reflection surface is configured like a mirror.

Meanwhile, the reason for the surface particle degree of the screen material rear surface 4a being 80-1500 is that when the surface particle degree is 80 mesh or less, the left and right viewing angles of the screen widen but the surface of the screen becomes coarse and thus the image having high resolution degree cannot be displayed.

Additionally, when the surface particle degree is 80 mesh, the left and right diffusion angles of the screen becomes almost 180 degree.

However, when the surface particle degree of the screen is 160 mesh or more, which is considered to be fine, the brightness increases whereas the left and right diffusion angles decrease to ½ and thus the left and right viewing angles decrease similarly to the decrease of the diffusion angle.

Meanwhile, when the surface particle degree is 1500 mesh or more, a reflection surface is configured to form hot spots which decrease screen function.

The present invention can be implemented as described in the following embodiments.

Embodiment 1

A durability of a screen surface can be increased by applying acryl resin having a refraction rate of 1.5 or less on a surface of the reflection layer 3 of the screen surface 2 for displaying 3D image as a protection layer.

Embodiment 2

A semi-transparent vinyl chloride having a refraction rate of 1.6 or less can be combined to the surface of the reflection layer 3. At this time, a thickness of the vinyl chloride is 3 mm or less and when the thickness of the vinyl chloride is greater than 2 mm, the refraction can be diffused.

Embodiment 3

A dye layer of dark color may be applied on a surface of the screen material rear face 4a. The dye has to be a transparent dye through which light can be transmitted. The dye layer allows the screen to be darker to increase the contrast of the screen to two times or more.

Embodiment 4

The screen material 4 may be aluminum, and stainless steel or the like. In this case, the reflection layer 3 itself may not changed, however, the surface particle degree of separation of the front and rear surface of the screen material 4 has to be the same as described above.

Embodiment 5

Figure 2:
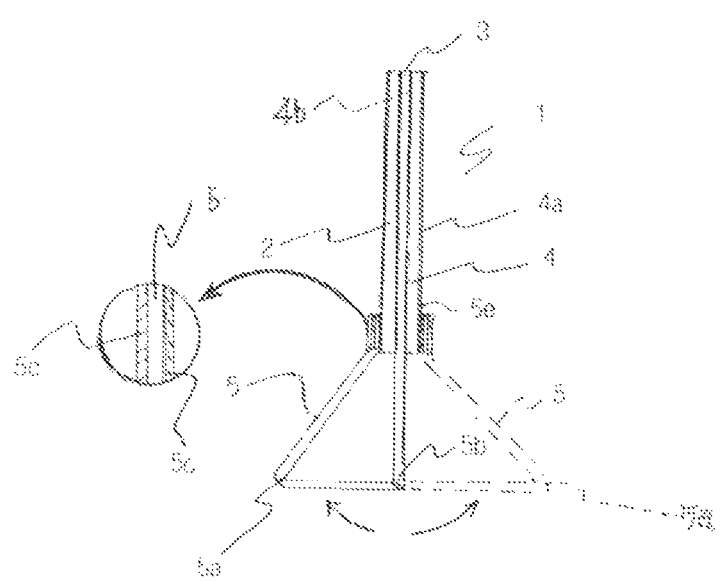
FIG. 2 is a perspective view showing a multi-sided screen which is applied to a portable screen according to an embodiment of the present invention.

A supporting rod 5 which is rotatable in frontward and rearward directions may be coupled to a lower part of the multi-sided screen 1, as shown in FIG. 2, such that the front surface and rear surface of the multi-sided screen are exchangeable to use alternatively as a 3D image screen or a high resolution screen, if necessary.

In detailed description, a first bent line 5a and a second bent line 5b are provided on the support rod 5 and further a fixing device 5c such as magnetic body or magnet or Velcro, which are connected or disconnected, is provided on a front and rear surfaces of the upper part of the support rod 5.

Further, a fixing device 5c such as magnetic body or magnet or Velcro, which are connected or disconnected, is provided on a left and right sides of the screen material rear face 4a and a screen material face 4b so that the supporting rod 5 is connected and disconnected to be rotated.

Embodiment 6

Figure 3:
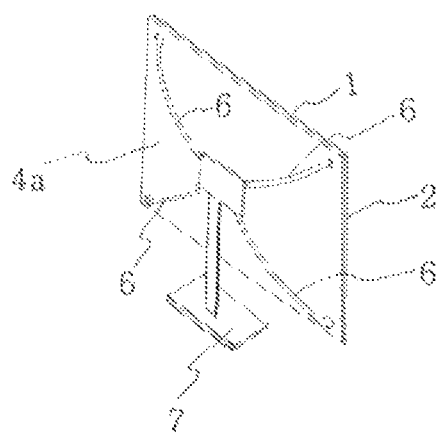
FIG. 3 is a perspective view showing a multi-sided screen which is applied to an assembly-type portable screen according to an embodiment of the present invention.

A groove may be formed on four corners of up and down side, and left and right side of the multi-sided screen 1, as shown in FIG. 3, a cross stick 6 is hung over the grooves to deploy the screen and a support rod 5 may be provided at a lower part of the screen. This configuration may be applied to a portable screen such as a small projector.

Embodiment 7

Figure 4:
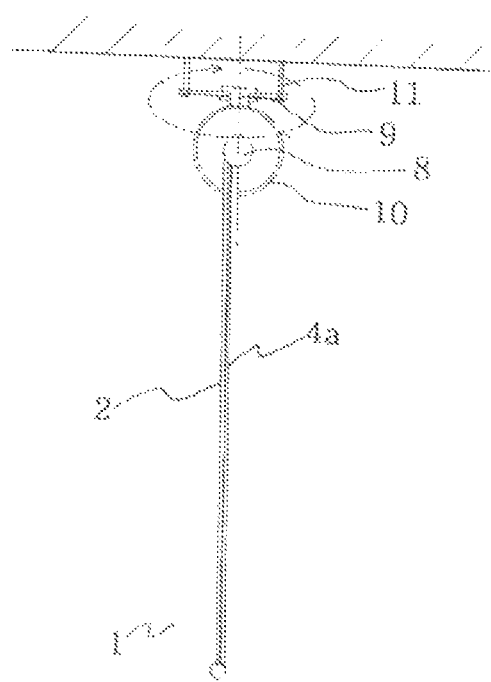
FIG. 4 is a perspective view showing a multi-sided screen which is applied to a roll-up screen according to an embodiment of the present invention.

A known roll screen 10 may be provided to the multi-sided screen 1, as shown in FIG. 4, wherein a rotation axis 9 is provided on an upper part of the roll screen 10 and fixed to a ceiling using a bracket 11 and the multi-sided screen 1 is connected to the rotation axis 9 of the roll screen 10 so that the multi-sided screen 1 is moved vertically and the roll screen 10 is rotated to be used alternatively as a screen for a 3D image or a screen for high resolution image.

Here, when the up and down configurations may be reversed and the support rod may be connected thereto, it may be used as a portable screen.

Therefore, the screen surface 2 of the multi-sided screen according to the present invention can be used as a 3D image surface for all 3D images including passive 3D imaging and active 3D imaging or the like.

Further, the multi-sided screen according to the present invention can be used as a high reflection screen for a small projector having a low brightness.

Here, the screen material rear face 4a can be functioned as a high contrast screen or wide view angle screen.

According to the present invention, one face of a screen among a front surface and a rear surface of a single screen is used as a screen for a polarized 3D image or a reflective screen having a high efficiency and the other face is used as a screen having a high resolution and high contrast whereby one screen face is used for a passive 3D image, an active 3D image or a high reflection screen of a low light projector and the other face thereof is used for a wide view angle screen, a high contrast screen or a screen for a video image of high resolution of greater than HD level in a single screen, depending on the use of the screen.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A multi-sided screen for viewing 2D and 3D images, said multi-sided screen comprising:
   a reflection layer having a first surface and a second surface, said reflection layer being formed by depositing or applying aluminum on a surface of a screen material of the first and second surface of the multi-sided screen configured to receive and/or reflect a projected image;
   a 3D image screen surface coupled to the first surface of the reflection layer forming a front surface of the multi-sided screen, said 3D image screen surface comprising resin having a refraction rate of 1.6 or less; and
   a 2D image screen face coupled to the second surface of the reflection layer forming a rear surface of the multi-sided screen, said 2D image screen comprising a white colored material having a surface particle degree of 80-1500 mesh,
   wherein the front surface and the rear surface of the multi-sided screen are formed differently from different materials, and wherein a transparent material of dark color tone through which light is transmitted is added to the second surface of the screen material.

2. The multi-sided screen of claim 1, wherein the reflection layer is formed on the surface of the screen material having a surface particle degree of 100-3000 mesh.

3. The multi-sided screen of claim 1, wherein each of said 2D image screen surface and 3D image screen surface comprises at least four corners, each of said four corners adjacent to a groove said groove being connectable to a cross stick to enable portability of the multi-sided screen.

4. The multi-sided screen according to claim 1, wherein the 3D image screen comprises silicon, urethane, or vinyl chloride.

5. A multi-sided screen for viewing 2D and 3D images, said multi-sided screen comprising:
   a reflection layer having a first surface and a second surface, said reflection layer being formed by depositing or applying aluminum on a surface of a screen material of the first and second surface of the multi-sided screen configured to receive and/or reflect a projected image;
   a 3D image screen surface coupled to the first surface of the reflection layer forming a front surface of the multi-sided screen, said 3D image screen surface comprising resin having a refraction rate of 1.6 or less;
   a 2D image screen face coupled to the second surface of the reflection layer forming a rear surface of the multi-sided screen, said 2D image screen comprising a white colored material having a surface particle degree of 80-1500 mesh;
   a support rod configured to support the multi-sided screen; and
   a fixing device coupled to the support rod and multi-sided screen,
   wherein the front surface and the rear surface of the multi-sided screen are formed differently from different materials,
   wherein said support rod is configured to rotate between the front surface and the rear surface of the multi-sided screen,
   wherein said fixing device is configured so that the support rod is connected and disconnected from the front and rear surface of the multi-sided screen, and
   wherein the support rod comprises a first bent line and a second bent line on a lower part of the multi-sided screen to enable the selection between the 2D image screen and 3D image screen depending on a rotation of the support rod.

6. The multi-sided screen according to claim 5, wherein the fixing device comprises a magnetic body or Velcro.

7. A multi-sided screen for viewing 2D and 3D images, said multi-sided screen comprising:
- a reflection layer having a first surface and a second surface, said reflection layer being formed by depositing or applying aluminum on a surface of a screen material of the first and second surface of the multi-sided screen configured to receive and/or reflect a projected image;
- a 3D image screen surface coupled to the first surface of the reflection layer forming a front surface of the multi-sided screen, said 3D image screen surface comprising resin having a refraction rate of 1.6 or less; and
- a 2D image screen face coupled to the second surface of the reflection layer forming a rear surface of the multi-sided screen, said 2D image screen comprising a white colored material having a surface particle degree of 80-1500 mesh,
- wherein the front surface and the rear surface of the multi-sided screen are formed differently from different materials, and
- wherein the multi-sided screen is connected to a roll screen, the roll screen being configured to be rotatable around a rotation axis to enable the selection of one of the 2D image screen and the 3D image screen.

* * * * *